United States Patent [19]

Adachi

[11] Patent Number: 6,159,604

[45] Date of Patent: Dec. 12, 2000

[54] SEED DIAMOND POWDER EXCELLENT IN ADHESION TO SYNTHETIC DIAMOND FILM FORMING SURFACE AND DISPERSED SOLUTION THEREOF

[75] Inventor: Miki Adachi, Omiya, Japan

[73] Assignee: Mitsubishi Materials Corporation, Tokyo, Japan

[21] Appl. No.: 09/169,132

[22] Filed: Oct. 9, 1998

[30] Foreign Application Priority Data

Oct. 9, 1997 [JP] Japan ................................. 9-277375
Mar. 30, 1998 [JP] Japan ................................. 10-083675

[51] Int. Cl.[7] .......................... B32B 5/16; B32B 9/00; B32B 15/02; B32B 17/02; B32B 19/00
[52] U.S. Cl. ............... 428/403; 427/249.12; 427/249.8; 423/446; 252/318; 252/319
[58] Field of Search ........................ 428/403, 697; 427/249.12, 249.8; 423/446; 378/51–90; 252/318, 319

[56] References Cited

U.S. PATENT DOCUMENTS 5,485,804  1/1996  Adair .
5,614,272  3/1997  Shah .
5,861,349  1/1999  Vereschagin et al. .
5,916,955  6/1999  Vereschagin et al. .

*Primary Examiner*—Deborah Jones
*Assistant Examiner*—Wendy Boss
*Attorney, Agent, or Firm*—Oblon, Spivak, McClelland, Maier & Neustadt, P.C.

[57] ABSTRACT

A diamond powder, comprises diamond powder particles, and polar and non-polar groups, bonded onto surfaces of the particles. This seed diamond powder and a dispersed solution thereof can be used to seed a substrate for the deposition of diamond at a high nucleation density for chemical vapor deposition of synthetic diamond.

32 Claims, No Drawings

SEED DIAMOND POWDER EXCELLENT IN ADHESION TO SYNTHETIC DIAMOND FILM FORMING SURFACE AND DISPERSED SOLUTION THEREOF

BACKGROUND OF THE INVENTION

1. Field of the Invention

The present invention relates to a method of providing a seed diamond powder based on a seeding process which permits obtaining a thin synthetic diamond film, and simultaneously solve restrictions on the material for the synthetic diamond film forming surface (substrate surface).

The present invention makes it possible to synthesize a synthetic diamond film at a high nucleation density on various substrates such as oxide-based ceramics including $SiO_2$, non-oxide-based ceramic including SiC, and metals. A synthetic diamond on a substrate is applicable for various uses utilizing properties of diamond. Typical examples of such uses include a protective film for a transparent substrate, an electron emitter for a field emission display, an SAW (surface acoustic wave) filter utilizing the higher sound velocity in diamond, a membrane for X-ray lithography, and a semiconductor device.

2. Description of the Background

Unless the substrate is pretreated, a synthetic diamond cannot be nucleated at a high nucleation density in the initial stage of vapor deposition, and it has been difficult to obtain a film-shaped diamond. To solve this problems trials have been made to improve the nucleation density in the form of, for example, the scratching process (improving the nucleation density by providing flaws on the substrate surface), and the seeding process (dispersing diamond powder in an aqueous solution or methanol and coating the same). The in-situ process is reported to be capable of improving the nucleation density by applying a negative bias to an Si substrate, and causing C atoms to be present on the substrate surface (a kind of implanting).

For the purpose of adhering seed diamond powder to a substrate, more specifically, it has been the usual practice to pre-treat by immersing an Si wafer in a dispersed solution prepared by dispersing a seed diamond powder having a particle size smaller than 2,000 nm in a methanol solution at a rate of 0.6 g/l, thereby causing the seed diamond powder to adhere to the substrate surface.

There is also known a technique to use synthetic diamond powder as a seed material powder, and as disclosed in Japanese Unexamined Patent Publication No. H09-25110, with a view to removing surface impurities, make a composition adjustment through washing with sulftric acid, nitric acid, potassium nitrate or chromic acid, thereby achieving bonding distribution of polar groups comprising hydroxyl groups (OH) or carbonyl groups (C=O) on the resultant surfaces of the seed diamond powder particles.

The scratching process, however, involves problems such as a damage to the substrate surface, limiting the substrate materials to Si, Mo, Pt and Ir, and a nucleation density lower than in the seeding process. Application of bias is used only for a few kinds of substrates, such as an Si substrate.

In the conventional seeding process, furthermore, applicable substrates are limited to Si and the like, and non-uniform seeding causes blurs in the vapor-deposited diamond film. Thus these defects have not as yet been overcome.

Applications of synthetic diamond films has therefore been limited because of the limitation on substrate materials. Unavailability of a sufficiently high nucleation density has led to defects in thick film-shaped diamond films. This is not desirable since this exerts an adverse effect on flatness of the formed synthetic diamond film and properties of the film itself.

SUMMARY OF THE INVENTION

To solve the aforementioned problems, the present invention provides a method of causing polar and non-polar groups to be coexistently distributed on the surfaces of seed diamond powder particles and seeding this seed diamond powder onto a synthetic diamond film forming surface (substrate surface), so that this seed diamond, excellent in adhesion, adheres to the substrate surface at a high density, thus giving a polycrystal diamond thin film of a high nucleation density free from blurs on the substrate surface.

More specifically, polar groups comprising hydroxyl group (OH), carbonyl group (C=O), aldehyde group (CHO) and/or carboxyl group (COOH) are surface bonded onto the surfaces of the diamond powder particles by applying a stirring treatment for a prescribed period of time in a treatment solution, such as a hydrogen peroxide/aqueous ammonia solution, an aqueous sulfuric acid/hydrogen peroxide solution, an aqueous aldehyde solution, or an aqueous acetic acid solution. Then, non-polar group comprising one or more selected from alkyl group ($C_nH_{2n+1}$) phenyl group ($C_6H_5$), vinyl group ($CH=CH_2$), acetyl group ($CH_3CO$), alkoxyl group ($OC_nH_{2n+1}$) and methacryl group ($CH_2=CCH_3$) are surface-bonded by applying a stirring treatment for a prescribed period of time in a treatment solution such as a polyoxyethylenealkylether-containing solution, a triphenylsilanol-containing solution, a trimethoxyvinylsilane-containing solution, or a triethoxymethacrylsilane-containing solution. The resultant seeding diamond powder on which polar and non-polar groups are surface-bonded and coexistently distributed, brings about an excellent adhesion to the synthetic diamond film forming surface (substrate surface), adheres at a high density, and serves as diamond nucleation sites.

However, in order to cause the diamond to adhere to the substrate without blurs, particularly when applying the diamond to any of various substrates, as in the present invention, an appropriate dispersant should be selected. In order to reduce blurs occurring during seeding (causing blurs after diamond vapor deposition), it is necessary to take account of wettability to the substrate and the drying (vaporizing) rate, and a dispersant suitable for the seed diamond powder should be selected.

A small dispersion ratio of the seed diamond powder relative to the dispersant cannot improve adhering density of seeding. With a large ratio, on the other hand, a part of the seed diamond powder precipitates in the dispersed solution, thus making it difficult to obtain a dispersed solution of a high concentration. The concentration should therefore preferably be within a range of from 0.01 to 3.0 g/l, or more preferably, from 0.03 to 2.0 g/l.

Dispersants can be selected from any liquid as long as it does not react with the substrate or the diamond powder, and wets the substrate surface. For example, they are alcohols, such as methanol, ethanol and 2-propanol; ketones, such as acetone; ethers, such as diethyl ether; aldehydes, such as acetaldehyde; and esters, such as ethyl acetate.

This permits achievement of a very high film forming rate of the synthetic diamond film in the initial stage of vapor deposition.

DESCRIPTION OF THE PREFERRED EMBODIMENTS

Having generally described this invention, a further understanding can be obtained by reference to certain specific examples which are provided herein for purposes of illustration only and are not intended to be limiting unless otherwise specified.

A commercially available cluster diamond powder having an average particle size within a range of from 5 to 30 nm was provided as the raw material powder (hereinafter referred to as a "raw material diamond powder"). Seed diamond powder samples α to κ and A to W were prepared by treating the raw material diamond powder first under the conditions shown in Table 2 while stirring, after removing surface impurities, in a treatment solution corresponding to the surface bonded group shown in Table 1, and a mixed treatment solution of two or more of these treatment solutions, to cause surface bonding of polar groups, and then, similarly treating under conditions shown in Table 2 to cause surface bonding of non-polar groups.

For comparison purposes, comparative seed diamond powder samples a to j were prepared under the same conditions except that surface bonding of the non-polar groups was not carried out, as shown in Table 3.

The resultant seed diamond powder samples were analyzed by the Fourier transform infrared spectroscopy. As a result, peaks for the polar and non-polar groups were observed in all the seed diamond powder samples α to κ and A to W of the invention. In the comparative seed diamond samples a to j, in contrast, only polar groups were confirmed.

Then, seed diamond powder applying examples 1 to 59 of the invention and comparative seed diamond powder applying examples 1 to 46 were prepared for forming a synthetic diamond film under the following conditions, using the aforementioned various seed diamond powder samples.

For the purpose of determining preferable concentrations of seed diamond powder in the dispersed solution, tests were carried out with various concentrations. These tests covered examples 60 to 64 and comparative examples 47 to 51.

First, each of the aforementioned various seed diamond powder samples was dispersed in a methyl alcohol solution at a ratio shown in Tables 4 to 8. The resultant dispersed solution was adjusted and adherence was conducted under the following conditions:

Adhering Condition (I)

A washed substrate was immersed in the aforementioned dispersed solution. After the lapse of a minute of immersion, the substrate was pulled up, rinsed in isopropyl alcohol for five minutes, and then left to dry.

Adhering Condition (II)

A washed substrate was immersed in the aforementioned dispersed solution. After holding for ten minutes under the application of ultrasonic waves, the substrate was pulled up and immersed in isopropyl alcohol for five minutes also under the application of ultrasonic waves. After rinsing, the substrate was left to dry.

Adhering Condition (III)

A washed substrate and a pure Al plate were immersed in the aforementioned dispersed solution. A voltage of 24 V was impressed between the Si substrate as an anode and the pure Al plate as a cathode, with a gap of 30 mm in between. After maintaining this state for five minutes, they were pulled out, and rinsed for five minutes in isopropyl alcohol. Then, they were left to dry.

Adhering Condition (IV)

The aforementioned dispersed solution was sprayed from a spray nozzle having a bore diameter of 0.3 mm uniformly onto the surface of the washed substrate. Then, immediately (while it is still wet), the substrate was rinsed in isopropyl alcohol for five minutes, and then left to dry.

The subsequent steps comprised causing each of the individual seed diamond powder samples to adhere to the surface of the aforementioned washed substrate under any of the above-mentioned conditions (I), (II), (III) and (IV), charging the substrate having diamond powder adhering thereto in a microwave plasma apparatus serving as a synthetic diamond film forming chemical vapor depositing apparatus, carrying out synthetic diamond nucleation under the conditions:

Reaction gas composition: $H_2/CH_4$ ration: 100/1

Pressure: 30 torr

Substrate temperature: 500 to 800° C.

Time: 5 min, measuring the nucleation density through electron microscopic observation, forming a synthetic diamond film under the same conditions, and measuring the synthesizing time up to a film thickness of 2 $\mu$m. The result of measurement is shown in Tables 4 to 8.

In the examples and comparative examples regarding the concentration of the dispersed solution, measurement of the synthesizing time was omitted.

EXAMPLE 1

Substrate: 100 mm diameter×1 mm thick quartz ($SiO_2$) wafer
Polar/non-polar group surface bond condition: α
Seed diamond dispersing ratio: 0.2 g/l
Adhering condition: I

EXAMPLE 2

Substrate: 100 mm diameter×1 mm thick borate-based glass (softening point: approx. 500° C.) wafer
Polar/non-polar group surface bond condition: α
Seed diamond dispersing ratio: 0.5 g/l
Adhering condition: I

EXAMPLE 3

Substrate: 100 mm diameter×1 mm thick silicon wafer with a 50 $\mu$m thermal oxide film
Polar/non-polar group surface bond condition: δ
Seed diamond dispersing ratio: 0.2 g/l
Adhering condition: I

EXAMPLE 4

Substrate: Wafer comprising a 100 mm diameter×1 mm thick borate-based glass substrate totally coated with zinc oxide (ZnO) by high-frequency plasma process to a thickness of 2 $\mu$m
Polar/non-polar group surface bond condition: β
Seed diamond dispersing ratio: 1.0 g/l
Adhering condition: I

EXAMPLE 5

Substrate: Wafer comprising a 100 mm diameter×500 $\mu$m thick silicon wafer totally coated with magnesium oxide (MgO) by the reactive sputtering process to a thickness of 1 $\mu$m
Polar/non-polar group surface bond condition: γ
Seed diamond dispersing ratio: 0.2 g/l
Adhering condition: I

EXAMPLE 6

Substrate: Wafer comprising a 100 mm diameter×500 $\mu$m thick silicon wafer totally coated with indium-tin oxide (ITO) by the reactive sputtering process to a thickness of 1 $\mu$m
Polar/non-polar group surface bond condition: δ
Seed diamond dispersing ratio: 0.5 g/l
Adhering condition: I

EXAMPLE 7
Substrate: 100 mm diameter×1 mm thick zirconium oxide wafer
Polar/non-polar group surface bond condition: $\epsilon$
Seed diamond dispersing ratio: 1.0 g/l
Adhering condition: II

EXAMPLE 8
Substrate: 50 mm×50 mm×1 mm thick aluminum oxide wafer
Polar/non-polar group surface bond condition: $\beta$
Seed diamond dispersing ratio: 0.5 g/l
Adhering condition: I

EXAMPLE 9
Substrate: A substrate comprising a 100 mm diameter×1 mm thick 6% (wt. %) WC-Co substrate totally coated with aluminum oxide by the chemical vapor deposition (CVD) process to a thickness of 5 $\mu$m
Polar/non-polar group surface bond condition: $\gamma$
Seed diamond dispersing ratio: 1.0 g/l
Adhering condition: II

EXAMPLE 10
Substrate: Wafer comprising a 100 mm diameter×1 mm thick silicon wafer totally coated with titanium oxide by the high-frequency ion plating process to a thickness of 3 $\mu$m
Polar/non-polar group surface bond condition: $\delta$
Seed diamond dispersing ratio: 0.5 g/l
Adhering condition: IV

EXAMPLE 11
Substrate: 100 mm diameter×1 mm thick silicon carbide wafer
Polar/non-polar group surface bond condition: $\zeta$
Seed diamond dispersing ratio: 0.5 g/l
Adhering condition: I

EXAMPLE 12
Substrate: Substrate comprising a 100 mm diameter×1 mm thick 6% (wt. %) WC—Co substrate totally coated with titanium nitride by the chemical vapor deposition (CVD) process to a thickness of 2 $\mu$m
Polar/non-polar group surface bond condition: $\zeta$
Seed diamond dispersing ratio: 0.5 g/l
Adhering condition: I

EXAMPLE 13
Substrate: 100 mm diameter×1 mm thick 6% (wt. %) WC—Co substrate
Polar/non-polar group surface bond condition: $\iota$
Seed diamond dispersing ratio: 1.0 g/l
Adhering condition: I

EXAMPLE 14
Substrate: Wafer comprising a 100 mm diameter×0.5 mm thick sapphire substrate totally coated with aluminum nitride by the high-frequency ion plating process to a thickness of 2 $\mu$m
Polar/non-polar group surface bond condition: $\kappa$
Seed diamond dispersing ratio: 0.2 g/l
Adhering condition: I

EXAMPLE 15
Substrate: 100 mm diameter×1 mm thick sialon (Si—Al—O—N) substrate
Polar/non-polar group surface bond condition: $\eta$
Seed diamond dispersing ratio: 1.0 g/l
Adhering condition: II

EXAMPLE 16
Substrate: 50 mm×50 mm×1 mm thick zirconium carbide substrate
Polar/non-polar group surface bond condition: $\theta$
Seed diamond dispersing ratio: 0.2 g/l
Adhering condition: I

EXAMPLE 17
Substrate: Substrate comprising a 100 mm diameter×1 mm thick 6% (wt. %) WC—Co substrate totally coated with titanium carbide by the chemical vapor deposition process to a thickness of 1 $\mu$m
Polar/non-polar group surface bond condition: $\zeta$
Seed diamond dispersing ratio: 0.5 g/l
Adhering condition: I

EXAMPLE 18
Substrate: Substrate comprising a 100 mm diameter×1 mm thick 6% (wt. %) WC—Co substrate totally coated with titanium carbo-nitride by the chemical vapor deposition (CVD) process into a thickness of 1 $\mu$m
Polar/non-polar group surface bond condition: $\eta$
Seed diamond dispersing ratio: 0.2 g/l
Adhering condition: I

EXAMPLE 19
Substrate: 100 mm diameter×1 mm thick silicon nitride substrate
Polar/non-polar group surface bond condition: $\theta$
Seed diamond dispersing ratio: 0.5 g/l
Adhering condition: II

EXAMPLE 20
Substrate: 100 mm diameter×1 mm thick zirconium nitride substrate
Polar/non-polar group surface bond condition: $\iota$
Seed diamond dispersing ratio: 1.0 g/l
Adhering condition: I

EXAMPLE 21
Substrate: 10 mm diameter×10 mm×0.2 mm thick platinum substrate
Polar/non-polar group surface bond condition: $\iota$
Seed diamond dispersing ratio: 0.2 g/l
Adhering condition: I

EXAMPLE 22
Substrate: 100 mm diameter×1 mm thick copper substrate
Polar/non-polar group surface bond condition: $\eta$
Seed diamond dispersing ratio: 0.5 g/l
Adhering condition: III

EXAMPLE 23
Substrate: 100 mm diameter×1 mm thick aluminum substrate
Polar/non-polar group surface bond condition: $\iota$
Seed diamond dispersing ratio: 0.5 g/l
Adhering condition: I

EXAMPLE 24
Substrate: Substrate comprising a 100 mm diameter×1 mm thick silicon wafer totally coated with gold by vacuum deposition to a thickness of 0.2 $\mu$m
Polar/non-polar group surface bond condition: $\kappa$
Seed diamond dispersing ratio: 0.5 g/l
Adhering condition: III

EXAMPLE 25
Substrate: 100 mm diameter×1 mm thick nickel substrate
Polar/non-polar group surface bond condition: ι
Seed diamond dispersing ratio: 1.0 g/l
Adhering condition: I

EXAMPLE 26
Substrate: Substrate comprising a 100 mm diameter×1 mm thick silicon wafer totally coated with titanium by the chemical vapor deposition process to a thickness of 0.2 μm
Polar/non-polar group surface bond condition: ζ
Seed diamond dispersing ratio: 1.0 g/l
Adhering condition: IV

EXAMPLE 27
Substrate: Substrate comprising a 100 mm diameter×1 mm thick silicon wafer totally coated with cobalt by the electric deposition process to a thickness of 0.5 μm
Polar/non-polar group surface bond condition: κ
Seed diamond dispersing ratio: 0.2 g/l
Adhering condition: I

EXAMPLE 28
Substrate: 100 mm diameter×1 mm thick molybdenum substrate
Polar/non-polar group surface bond condition: ζ
Seed diamond dispersing ratio: 0.5 g/l
Adhering condition: II

EXAMPLE 29
Substrate: Substrate comprising a 100 mm diameter×1 mm thick copper substrate totally coated with palladium by the sputtering process into a thickness of 1 μm
Polar/non-polar group surface bond condition: η
Seed diamond dispersing ratio: 0.5 g/l
Adhering condition: I

EXAMPLE 30
Substrate: Substrate comprising a 100 mm diameter×1 mm thick silicon wafer totally coated with silver by vacuum deposition process to a thickness of 0.5 μm
Polar/non-polar group surface bond condition: κ
Seed diamond dispersing ratio: 2.0 g/l
Adhering condition: I

EXAMPLE 31: SILICON WAFER
Substrate: 100 mm diameter×380 gm thick silicon wafer
Polar/non-polar group surface bond condition: A
Seed diamond dispersing ratio: 0.2 g/l
Adhering condition: I

EXAMPLE 32: SILICON WAFER
Substrate: 100 mm diameter×380 μm thick silicon wafer
Polar/non-polar group surface bond condition: B
Seed diamond dispersing ratio: 0.5 g/l
Adhering condition: I

EXAMPLE 33: SILICON WAFER
Substrate: 100 mm diameter×380 μm thick silicon wafer
Polar/non-polar group surface bond condition: C
Seed diamond dispersing ratio: 0.2 g/l
Adhering condition: I

EXAMPLE 34: SILICON WAFER
Substrate: 100 mm diameter×380 μm thick silicon wafer
Polar/non-polar group surface bond condition: D
Seed diamond dispersing ratio: 1.0 g/l
Adhering condition: I

EXAMPLE 35: SILICON WAFER
Substrate: 100 mm diameter×380 μm thick silicon wafer
Polar/non-polar group surface bond condition: E
Seed diamond dispersing ratio: 0.5 g/l
Adhering condition: I

EXAMPLE 36: SILICON WAFER
Substrate: 100 mm diameter×380 μm thick silicon wafer
Polar/non-polar group surface bond condition: F
Seed diamond dispersing ratio: 2.0 g/l
Adhering condition: I

EXAMPLE 37: SILICON WAFER
Substrate: 100 mm diameter×380 μm thick silicon wafer
Polar/non-polar group surface bond condition: G
Seed diamond dispersing ratio: 0.5 g/l
Adhering condition: I

EXAMPLE 38: SILICON WAFER
Substrate: 100 mm diameter×380 μm thick silicon wafer
Polar/non-polar group surface bond condition: H
Seed diamond dispersing ratio: 1.0 g/l
Adhering condition: I

EXAMPLE 39: SILICON WAFER
Substrate: 100 mm diameter×380 μm thick silicon wafer
Polar/non-polar group surface bond condition: I
Seed diamond dispersing ratio: 0.2 g/l
Adhering condition: I

EXAMPLE 40: SILICON WAFER
Substrate: 100 mm diameter×380 μm thick silicon wafer
Polar/non-polar group surface bond condition: J
Seed diamond dispersing ratio: 0.5 g/l
Adhering condition: I

EXAMPLE 41: SILICON WAFER
Substrate: 100 mm diameter×380 μm thick silicon wafer
Polar/non-polar group surface bond condition: K
Seed diamond dispersing ratio: 0.5 g/l
Adhering condition: I

EXAMPLE 42: SILICON WAFER
Substrate: 100 mm diameter×380 μm thick silicon wafer
Polar/non-polar group surface bond condition: L
Seed diamond dispersing ratio: 0.2 g/l
Adhering condition: I

EXAMPLE 43: SILICON WAFER
Substrate: 100 mm diameter×380 μm thick silicon wafer
Polar/non-polar group surface bond condition: M
Seed diamond dispersing ratio: 0.5 g/l
Adhering condition: I

EXAMPLE 44: SILICON WAFER
Substrate: 100 mm diameter×380 μm thick silicon wafer
Polar/non-polar group surface bond condition: N
Seed diamond dispersing ratio: 0.5 g/l
Adhering condition: I

EXAMPLE 45: SILICON WAFER
Substrate: 100 mm diameter×380 μm thick silicon wafer
Polar/non-polar group surface bond condition: O
Seed diamond dispersing ratio: 0.5 g/l
Adhering condition: I

EXAMPLE 46: SILICON WAFER
Substrate: 100 mm diameter×380 μm thick silicon wafer
Polar/non-polar group surface bond condition: P Seed diamond dispersing ratio: 0.5 g/l
Adhering condition: I

EXAMPLE 47: SILICON WAFER
Substrate: 100 mm diameter×380 μm thick silicon wafer
Polar/non-polar group surface bond condition: Q
Seed diamond dispersing ratio: 0.2 g/l
Adhering condition: I

EXAMPLE 48: SILICON WAFER
Substrate: 100 mm diameter×380 μm thick silicon wafer
Polar/non-polar group surface bond condition: R
Seed diamond dispersing ratio: 0.5 g/l
Adhering condition: I

EXAMPLE 49: SILICON WAFER
Substrate: 100 mm diameter×380 μm thick silicon wafer
Polar/non-polar group surface bond condition: S
Seed diamond dispersing ratio: 0.5 g/l
Adhering condition: I

EXAMPLE 50: SILICON WAFER
Substrate: 100 mm diameter×380 μm thick silicon wafer
Polar/non-polar group surface bond condition: T
Seed diamond dispersing ratio: 0.5 g/l
Adhering condition: I

EXAMPLE 51: SILICON WAFER
Substrate: 100 mm diameter×380 μm thick silicon wafer
Polar/non-polar group surface bond condition: U
Seed diamond dispersing ratio: 0.5 g/l
Adhering condition: I

EXAMPLE 52: SILICON WAFER
Substrate: 100 mm diameter×380 μm thick silicon wafer
Polar/non-polar group surface bond condition: V
Seed diamond dispersing ratio: 1.0 g/l
Adhering condition: I

EXAMPLE 53: SILICON WAFER
Substrate: 100 mm diameter×380 μm thick silicon wafer
Polar/non-polar group surface bond condition: W
Seed diamond dispersing ratio: 0.5 g/l
Adhering condition: I

EXAMPLE 54: SILICON WAFER
Substrate: 100 mm diameter×380 μm thick silicon wafer
Polar/non-polar group surface bond condition: A
Seed diamond dispersing ratio: 0.5 g/l
Adhering condition: II

EXAMPLE 55: SILICON WAFER
Substrate: 100 mm diameter×380 μm thick silicon wafer
Polar/non-polar group surface bond condition: J
Seed diamond dispersing ratio: 1.0 g/l
Adhering condition: II

EXAMPLE 56: SILICON WAFER
Substrate: 100 mm diameter×380 μm thick silicon wafer
Polar/non-polar group surface bond condition: B
Seed diamond dispersing ratio: 0.2 g/l
Adhering condition: III

EXAMPLE 57: SILICON WAFER
Substrate: 100 mm diameter×380 μm thick silicon wafer
Polar/non-polar group surface bond condition: O
Seed diamond dispersing ratio: 0.5 g/l
Adhering condition: III

EXAMPLE 58: SILICON WAFER
Substrate: 100 mm diameter×380 μm thick silicon wafer
Polar/non-polar group surface bond condition: C
Seed diamond dispersing ratio: 0.2 g/l
Adhering condition: IV

EXAMPLE 59: SILICON WAFER
Substrate: 100 mm diameter×380 μm thick silicon wafer
Polar/non-polar group surface bond condition: T
Seed diamond dispersing ratio: 1.0 g/l
Adhering condition: IV

EXAMPLE 61: SILICON WAFER
Substrate: 100 mm diameter×380 μm thick silicon wafer
Polar/non-polar group surface bond condition: A
Seed diamond dispersing ratio: 0.010 g/l
Adhering condition: II

EXAMPLE 62: SILICON WAFER
Substrate: 100 mm diameter×380 μm thick silicon wafer
Polar/non-polar group surface bond condition: A
Seed diamond dispersing ratio: 0.030 g/l
Adhering condition: II

EXAMPLE 63: SILICON WAFER
Substrate: 100 mm diameter×380 μm thick silicon wafer
Polar/non-polar group surface bond condition: A
Seed diamond dispersing ratio: 0.050 g/l
Adhering condition: II

EXAMPLE 64: SILICON WAFER
Substrate: 100 mm diameter×380 μm thick silicon wafer
Polar/non-polar group surface bond condition: A
Seed diamond dispersing ratio: 0.100 g/l
Adhering condition: II

EXAMPLE 65: SILICON WAFER
Substrate: 100 mm diameter×380 μm thick silicon wafer
Polar/non-polar group surface bond condition: A
Seed diamond dispersing ratio: 3.000 g/l
Adhering condition: II Comparative examples using the conventional art (seed diamond powder having only polar groups) and comparative examples with different seed diamond concentrations of the dispersed solution will now be described.

COMPARATIVE EXAMPLE 1
Substrate: 100 mm diameter×1 mm thick quartz (SiO$_2$) wafer
Polar/non-polar group surface bond condition: a
Seed diamond dispersing ratio: 0.2 g/l
Adhering condition: I

COMPARATIVE EXAMPLE 2
Substrate: 100 mm diameter×1 mm thick borate-based glass (softening point: approx. 500° C.) wafer
Polar/non-polar group surface bond condition: f
Seed diamond dispersing ratio: 0.5 g/l
Adhering condition: I

COMPARATIVE EXAMPLE 3
Substrate: 100 mm diameter×1 mm thick silicon wafer with a 50 μm thermal oxide film
Polar/non-polar group surface bond condition: d
Seed diamond dispersing ratio: 0.2 g/l
Adhering condition: I

COMPARATIVE EXAMPLE 4
Substrate: Wafer comprising a 100 mm diameter×1 mm thick borate-based glass substrate totally coated with zinc oxide (ZnO) by high-frequency plasma process to a thickness of 2 μm Polar/non-polar group surface bond condition: g
Seed diamond dispersing ratio: 1.0 g/l
Adhering condition: I COMPARATIVE EXAMPLE 5
Substrate: Wafer comprising a 100 mm diameter×500 μm thick silicon wafer totally coated with magnesium oxide (MgO) by the reactive sputtering process to a thickness of 1 μm
Polar/non-polar group surface bond condition: h
Seed diamond dispersing ratio: 0.2 g/l
Adhering condition: I COMPARATIVE EXAMPLE 6
Substrate: Wafer comprising a 100 mm diameter×500 μm thick silicon wafer totally coated with indium-tin oxide (ITO) by the reactive sputtering process to a thickness of 1 μm
Polar/non-polar group surface bond condition: i
Seed diamond dispersing ratio: 0.5 g/l
Adhering condition: I COMPARATIVE EXAMPLE 7
Substrate: 100 mm diameter×1 mm thick zirconium oxide wafer
Polar/non-polar group surface bond condition: e
Seed diamond dispersing ratio: 1.0 g/l
Adhering condition: II COMPARATIVE EXAMPLE 8
Substrate: 50 mm×50 mm×1 mm thick aluminum oxide wafer
Polar/non-polar group surface bond condition: b
Seed diamond dispersing ratio: 0.5 g/l
Adhering condition: I COMPARATIVE EXAMPLE 9
Substrate: A substrate comprising a 100 mm diameter×1 mm thick 6% (wt. %) WC—Co substrate totally coated with a μminμm oxide by the chemical vapor deposition (CVD) process into a thickness of 5 μm
Polar/non-polar group surface bond condition: c
Seed diamond dispersing ratio: 1.0 g/l
Adhering condition: III COMPARATIVE EXAMPLE 10
Substrate: Wafer comprising a 100 mm diameter×1 mm thick silicon wafer totally coated with titanium oxide by the high-frequency ion plating process to a thickness of 3 μm
Polar/non-polar group surface bond condition: a
Seed diamond dispersing ratio: 0.5 g/l
Adhering condition: IV COMPARATIVE EXAMPLE 11
Substrate: 100 mm diameter×1 mm thick silicon carbide wafer
Polar/non-polar group surface bond condition: j
Seed diamond dispersing ratio: 0.5 g/l
Adhering condition: I COMPARATIVE EXAMPLE 12
Substrate: Substrate comprising a 100 mm diameter×1 mm thick 6% (wt. %) WC—Co substrate totally coated with titanium nitride by the chemical vapor deposition (CVD) process to a thickness of 2 μm
Polar/non-polar group surface bond condition: c
Seed diamond dispersing ratio: 0.5 g/l
Adhering condition: I COMPARATIVE EXAMPLE 13
Substrate: 100 mm diameter×1 mm thick 6% (wt. %) WC—Co substrate
Polar/non-polar group surface bond condition: d
Seed diamond dispersing ratio: 1.0 g/l
Adhering condition: I COMPARATIVE EXAMPLE 14
Substrate: Wafer comprising a 100 mm diameter×0.5 mm thick sapphire substrate totally coated with aluminum nitride by the high-frequency ion plating process to a thickness of 2 μm
Polar/non-polar group surface bond condition: e
Seed diamond dispersing ratio: 0.2 g/l
Adhering condition: I COMPARATIVE EXAMPLE 15
Substrate: 100 mm diameter×1 mm thick sialon (Si—Al—O—N) substrate
Polar/non-polar group surface bond condition: a
Seed diamond dispersing ratio: 1.0 g/l
Adhering condition: II COMPARATIVE EXAMPLE 16
Substrate: 50 mm×50 mm×1 mm thick zirconium carbide substrate
Polar/non-polar group surface bond condition: b
Seed diamond dispersing ratio: 0.2 g/l
Adhering condition: I COMPARATIVE EXAMPLE 17
Substrate: Substrate comprising a 100 mm diameter×1 mm thick 6% (wt. %) WC—Co substrate totally coated with titanium carbide by the chemical vapor deposition process to a thickness of 1 μm
Polar/non-polar group surface bond condition: c
Seed diamond dispersing ratio: 0.5 g/l
Adhering condition: I COMPARATIVE EXAMPLE 18
Substrate: Substrate comprising a 100 mm diameter×1 mm thick 6% (wt. %) WC—Co substrate totally coated with titanium carbo-nitride by the chemical vapor deposition (CVD) process to a thickness of 1 μm
Polar/non-polar group surface bond condition: d
Seed diamond dispersing ratio: 0.2 g/l
Adhering condition: I COMPARATIVE EXAMPLE 19
Substrate: 100 mm diameter×1 mm thick silicon nitride substrate
Polar/non-polar group surface bond condition: e
Seed diamond dispersing ratio: 0.5 g/l
Adhering condition: II COMPARATIVE EXAMPLE 20
Substrate: 100 mm diameter×1 mm thick zirconium nitride substrate
Polar/non-polar group surface bond condition: g
Seed diamond dispersing ratio: 1.0 g/l
Adhering condition: I COMPARATIVE EXAMPLE 21
Substrate: 10 mm diameter×10 mm×0.2 mm thick platinum substrate
Polar/non-polar group surface bond condition: f
Seed diamond dispersing ratio: 0.2 g/l
Adhering condition: I

COMPARATIVE EXAMPLE 22
Substrate: 100 mm diameter×1 mm thick copper substrate
Polar/non-polar group surface bond condition: i
Seed diamond dispersing ratio: 0.5 g/l
Adhering condition: I

COMPARATIVE EXAMPLE 23
Substrate: 100 mm diameter×1 mm thick aluminum substrate
Polar/non-polar group surface bond condition: j
Seed diamond dispersing ratio: 0.5 g/l
Adhering condition: I

COMPARATIVE EXAMPLE 24
Substrate: Substrate comprising a 100 mm diameter×1 mm thick silicon wafer totally coated with gold by vacuum deposition to a thickness of 0.2 μm
Polar/non-polar group surface bond condition: g
Seed diamond dispersing ratio: 0.5 g/l
Adhering condition: III

COMPARATIVE EXAMPLE 25
Substrate: 100 mm diameter×1 mm thick nickel substrate
Polar/non-polar group surface bond condition: a
Seed diamond dispersing ratio: 1.0 g/l
Adhering condition: I

COMPARATIVE EXAMPLE 26
Substrate: Substrate comprising a 100 mm diameter×1 mm thick silicon wafer totally coated with titanium by the chemical vapor deposition process to a thickness of 0.2 μm
Polar/non-polar group surface bond condition: h
Seed diamond dispersing ratio: 1.0 g/l
Adhering condition: IV

COMPARATIVE EXAMPLE 27
Substrate: Substrate comprising a 100 mm diameter×1 mm thick silicon wafer totally coated with cobalt by the electric deposition process into a thickness of 0.5 μm
Polar/non-polar group surface bond condition: a
Seed diamond dispersing ratio: 0.2 g/l
Adhering condition: I

COMPARATIVE EXAMPLE 28
Substrate: 100 mm diameter×1 mm thick molybdenum substrate
Polar/non-polar group surface bond condition: b
Seed diamond dispersing ratio: 0.5 g/l
Adhering condition: II

COMPARATIVE EXAMPLE 29
Substrate: Substrate comprising a 100 mm diameter×1 mm thick copper substrate totally coated with palladium by the sputtering process to a thickness of 1 μm
Polar/non-polar group surface bond condition: c
Seed diamond dispersing ratio: 0.5 g/l
Adhering condition: I

COMPARATIVE EXAMPLE 30
Substrate: Substrate comprising a 100 mm diameter×1 mm thick silicon wafer totally coated with silver by vacuum deposition process to a thickness of 0.5 μm
Polar/non-polar group surface bond condition: b
Seed diamond dispersing ratio: 2.0 g/l
Adhering condition: I

COMPARATIVE EXAMPLE 31: SILICON WAFER
Substrate: 100 mm diameter×380 μm thick silicon wafer
Polar/non-polar group surface bond condition: a
Seed diamond dispersing ratio: 0.2 g/l
Adhering condition: I

COMPARATIVE EXAMPLE 32: SILICON WAFER
Substrate: 100 mm diameter×380 μm thick silicon wafer
Polar/non-polar group surface bond condition: b
Seed diamond dispersing ratio: 0.5 g/l
Adhering condition: I

COMPARATIVE EXAMPLE 33: SILICON WAFER
Substrate: 100 mm diameter×3 80 μm thick silicon wafer
Polar/non-polar group surface bond condition: c
Seed diamond dispersing ratio: 0.2 g/l
Adhering condition: I

COMPARATIVE EXAMPLE 34: SILICON WAFER
Substrate: 100 mm diameter×380 μm thick silicon wafer
Polar/non-polar group surface bond condition: d
Seed diamond dispersing ratio: 1.0 g/l
Adhering condition: I

COMPARATIVE EXAMPLE 35: SILICON WAFER
Substrate: 100 mm diameter×380 μm thick silicon wafer
Polar/non-polar group surface bond condition: e
Seed diamond dispersing ratio: 0.5 g/l
Adhering condition: I

COMPARATIVE EXAMPLE 36: SILICON WAFER
Substrate: 100 mm diameter×380 μm thick silicon wafer
Polar/non-polar group surface bond condition: f
Seed diamond dispersing ratio: 2.0 g/l
Adhering condition: I

COMPARATIVE EXAMPLE 37: SILICON WAFER
Substrate: 100 mm diameter×380 μm thick silicon wafer
Polar/non-polar group surface bond condition: g
Seed diamond dispersing ratio: 0.5 g/l
Adhering condition: I

COMPARATIVE EXAMPLE 38: SILICON WAFER
Substrate: 100 mm diameter×380 μm thick silicon wafer
Polar/non-polar group surface bond condition: h
Seed diamond dispersing ratio: 1.0 g/l
Adhering condition: I

COMPARATIVE EXAMPLE 39: SILICON WAFER
Substrate: 100 mm diameter×380 μm thick silicon wafer
Polar/non-polar group surface bond condition: i
Seed diamond dispersing ratio: 0.2 g/l
Adhering condition: I

COMPARATIVE EXAMPLE 40: SILICON WAFER
Substrate: 100 mm diameter×380 μm thick silicon wafer
Polar/non-polar group surface bond condition: j
Seed diamond dispersing ratio: 0.5 g/l
Adhering condition: I

COMPARATIVE EXAMPLE 41: SILICON WAFER

Substrate: 100 mm diameter×380 µm thick silicon wafer
Polar/non-polar group surface bond condition: a
Seed diamond dispersing ratio: 0.5 g/l
Adhering condition: II

COMPARATIVE EXAMPLE 42: SILICON WAFER

Substrate: 100 mm diameter×380 µm thick silicon wafer
Polar/non-polar group surface bond condition: e
Seed diamond dispersing ratio: 1.0 g/l
Adhering condition: II

COMPARATIVE EXAMPLE 43: SILICON WAFER

Substrate: 100 mm diameter×380 µm thick silicon wafer
Polar/non-polar group surface bond condition: c
Seed diamond dispersing ratio: 0.2 g/l
Adhering condition: III

COMPARATIVE EXAMPLE 44: SILICON WAFER

Substrate: 100 mm diameter×380 µm thick silicon wafer
Polar/non-polar group surface bond condition: f
Seed diamond dispersing ratio: 0.5 g/l
Adhering condition: III

COMPARATIVE EXAMPLE 45: SILICON WAFER

Substrate: 100 mm diameter×380 µm thick silicon wafer
Polar/non-polar group surface bond condition: b
Seed diamond dispersing ratio: 0.2 g/l
Adhering condition: IV

COMPARATIVE EXAMPLE 46: SILICON WAFER

Substrate: 100 mm diameter×380 µm thick silicon wafer
Polar/non-polar group surface bond condition: h
Seed diamond dispersing ratio: 1.0 g/l
Adhering condition: IV

COMPARATIVE EXAMPLE 47: SILICON WAFER

Substrate: 100 mm diameter×380 µm thick silicon wafer
Polar/non-polar group surface bond condition: A
Seed diamond dispersing ratio: 0.001 g/l
Adhering condition: II

COMPARATIVE EXAMPLE 48: SILICON WAFER

Substrate: 100 mm diameter×380 µm thick silicon wafer
Polar/non-polar group surface bond condition: A
Seed diamond dispersing ratio: 0.002 g/l
Adhering condition: II

COMPARATIVE EXAMPLE 49: SILICON WAFER

Substrate: 100 mm diameter×380 µm thick silicon wafer
Polar/non-polar group surface bond condition: A
Seed diamond dispersing ratio: 0.004 g/l
Adhering condition: II

COMPARATIVE EXAMPLE 50: SILICON WAFER

Substrate: 100 mm diameter×380 µm thick silicon wafer
Polar/non-polar group surface bond condition: A
Seed diamond dispersing ratio: 0.006 g/l
Adhering condition: II

COMPARATIVE EXAMPLE 51: SILICON WAFER

Substrate: 100 mm diameter×380 µm thick silicon wafer
Polar/non-polar group surface bond condition: A
Seed diamond dispersing ratio: 0.008 g/l
Adhering condition: II As is clear from the results shown in Tables 4 to 8, the seed diamond powder samples α to κ and A to W adhere to the substrate surface at a high density under the effect of coexisting surface-bonded polar and non-polar groups, thus permitting synthetic diamond nucleation at a high density, bringing about remarkable improvement in the film forming rate of the synthetic diamond film. In any of the conventional seed diamond samples a to j having surface bonding of only polar groups, in contrast, adhesion to the substrate surface is poorer: a synthetic diamond film does not nucleate at a high density, and the film forming rate is relatively low.

The results of the examples and the comparative examples suggest that the seed diamond powder concentration of the dispersed solution should preferably be within a range of from 0.01 to 3.0 g/l, or more preferably, from 0.03 to 2.0 g/l.

The seed diamond powder of the invention has a high adhesion to the substrate surface, as described above. It is therefore possible to accomplish synthetic diamond nucleation at a high density, irrespective of the kind of substrate, and as is evident from the examples, even for a wider film forming area.

TABLE 1

Polar and non-polar groups surface bonding treatment solution

| Kind of surface bonding group | | Treatment solution (in vol. %) |
| --- | --- | --- |
| Polar group | Hydroxyl group | Aqueous solution containing hydrogen peroxide (14%)/ammonia (14%) |
| | Carbonyl group | Sulfic acid (50%)/hydrogen peroxide water (50%) solution |
| | Aldehyde group | Aqueous solution containing acetaldehyde (10%) |
| | Carboxyl group | Aqueous solution containing acetic acid (5%) |
| Non-polar group | Alkyl group | Polyoxyethylenealkylether (10%)-containing isopropyl alcohol solution |
| | Phenyl group | Triphenylsilanol (0.2%)-containing acetone solution |
| | Vinyl group | Trimethoxyvinylsilane (0.3%)-containing methanol solution |
| | Acetyl group | Orthoaceton trimethyl (0.5%)-containing methanol solution |
| | Alkoxyl group | 2-methoxyethanol (1.0%)-containing ethanol solution |
| | Methacryl group | Triethoxymethacrylsilane (1.0%)-containing ethanol solution |

TABLE 2

Polar/non-polar group treatment conditions of seed diamond powder of the invention

| Kind | Average particle size of raw material diamond powder (nm) | Polar group surface bonding conditions Kind | Treatment solution temperature (° C.) | Time (min) | Non-polar group surface bonding conditions Kind | Treatment solution temperature (° C.) | Time (min) |
|---|---|---|---|---|---|---|---|
| Seed diamond powder | | | | | | | |
| α | 5 | OH,C=O | 80 | 120 | CH3CO | 85 | 30 |
| β | 20 | OH,CHO | 85 | 60 | OCnH2n + 1 | 80 | 15 |
| τ | 5 | COOH | 70 | 60 | C6H5 | 65 | 60 |
| δ | 5 | C=O | 80 | 60 | CH$_2$=CCH$_3$ | 50 | 30 |
| ε | 20 | CHO | 80 | 120 | CH=CH2,CH3CO | 70 | 15 |
| ζ | 5 | OH | 80 | 30 | CH=CH2,CH2=CCH3 | 85 | 60 |
| η | 5 | C=O,CHO | 70 | 15 | C6H5 | 80 | 30 |
| θ | 20 | C=O,COOH | 60 | 30 | CH3CO,C6H5 | 85 | 60 |
| ι | 5 | CHO,COOH | 80 | 30 | CnH2n + 1 | 70 | 120 |
| κ | 20 | C=O | 80 | 60 | OCnH2n + 1 | 85 | 60 |
| A | 5 | OH | 80 | 60 | CnH2n + 1 | 85 | 30 |
| B | 20 | C=O | 50 | 30 | C6H5 | 60 | 60 |
| C | 5 | CHO | 80 | 60 | CH=CH2 | 65 | 60 |
| D | 5 | COOH | 70 | 30 | CH3CO | 65 | 30 |
| E | 5 | OH,C=O | 60 | 30 | OCnH2n + 1 | 80 | 15 |
| F | 20 | OH,CHO | 80 | 60 | CH2=CCH3 | 80 | 60 |
| G | 5 | OH,COOH | 80 | 60 | CnH2n + 1,C6H5 | 85 | 60 |
| H | 5 | C=O,CHO | 50 | 60 | CnH2n + 1,CH=CH2 | 85 | 60 |
| I | 30 | C=O,COOH | 70 | 30 | CnH2n + 1,CH3CO | 85 | 30 |
| J | 5 | CHO,COOH | 70 | 30 | CnH2n + 1,OCnH2n + 1 | 85 | 60 |
| K | 5 | OH,C=O | 80 | 120 | CnH2n + 1,CH2=CCH3 | 85 | 60 |
| L | 5 | OH,C=O | 80 | 60 | C6H5,CH=CH2 | 65 | 15 |
| M | 5 | OH,C=O | 80 | 60 | C6H5,CH3CO | 65 | 30 |
| N | 20 | OH | 80 | 120 | C6H5,OCnH2n + 1 | 80 | 60 |
| O | 5 | C=O | 50 | 30 | C6H5,CH2=CCH3 | 80 | 30 |
| P | 5 | COOH | 70 | 60 | CH=CH2,CH3CO | 65 | 60 |
| Q | 5 | OH,C=O | 80 | 60 | CH=CH2,OCnH2n + 1 | 80 | 60 |
| R | 5 | OH,C=O,COOH | 80 | 120 | CH=CH2,CH2=CCH3 | 80 | 60 |
| S | 20 | CHO | 60 | 60 | CH3CO,OCnH2n + 1 | 80 | 30 |
| T | 30 | OH | 80 | 60 | CH3CO,CH2=CCH3 | 80 | 30 |
| U | 5 | OH,C=O | 80 | 60 | OCnH2n + 1,CH2=CCH3 | 80 | 60 |
| V | 5 | OH,C=O | 80 | 120 | CnH2n + 1,CH=CH2,CH2=CCH3 | 85 | 30 |
| W | 5 | OH,C=O | 80 | 60 | C6H5,CH3CO,OCnH2n + 1 | 80 | 60 |

TABLE 3

Treatment conditions of conventional seed diamond powder

| Kind | Average particle size of raw material diamond powder (nm) | Polar group surface bonding conditions Kind | Treatment solution temperature (° C.) | Time (min) |
|---|---|---|---|---|
| Conventional seed diamond powder | | | | |
| a | 5 | OH | 80 | 60 |
| b | 20 | C=O | 50 | 30 |
| c | 5 | CHO | 80 | 60 |
| d | 5 | COOH | 70 | 30 |
| e | 5 | OH,C=O | 60 | 30 |
| f | 20 | OH,CHO | 80 | 60 |
| g | 5 | OH,COOH | 80 | 60 |
| h | 5 | C=O,CHO | 50 | 60 |
| i | 30 | C=O,COOH | 70 | 30 |
| j | 5 | CHO,COOH | 70 | 30 |

TABLE 4

Seed diamond powder of the invention: Example (1)

| Kind | Kind of substrate | Seed diamond powder of the invention | | | Synthetic diamond nucleation density (n/cm²) | Synthesizing time of film thickness of 2 μm (hrs) |
|---|---|---|---|---|---|---|
| | | Symbol | Ratio of dispersion (g/l) | Adhering condition | | |
| Seed diamond powder of the invention | | | | | | |
| 1 | 1 | α | 0.2 | I | 2.2 × exp (12) | 4.5 |
| 2 | 2 | α | 0.5 | I | 2.1 × exp (11) | 7.6 |
| 3 | 3 | δ | 0.2 | I | 5.8 × exp (11) | 6.7 |
| 4 | 4 | β | 1.0 | I | 7.3 × exp (10) | 8.1 |
| 5 | 5 | γ | 0.2 | I | 4.2 × exp (11) | 7.0 |
| 6 | 6 | δ | 0.5 | I | 3.0 × exp (11) | 7.3 |
| 7 | 7 | ε | 1.0 | II | 1.5 × exp (11) | 7.8 |
| 8 | 8 | β | 0.5 | I | 9.5 × exp (11) | 5.2 |
| 9 | 9 | γ | 1.0 | II | 3.4 × exp (11) | 7.2 |
| 10 | 10 | δ | 0.5 | IV | 8.6 × exp (11) | 5.5 |
| 11 | 11 | ζ | 0.5 | I | 3.0 × exp (12) | 3.7 |
| 12 | 12 | ζ | 0.5 | I | 6.2 × exp (11) | 6.2 |
| 13 | 13 | ι | 1.0 | I | 1.8 × exp (12) | 4.5 |
| 14 | 14 | κ | 0.2 | I | 4.3 × exp (11) | 6.8 |
| 15 | 15 | η | 1.0 | II | 2.5 × exp (12) | 4.3 |
| 16 | 16 | θ | 0.2 | IV | 5.8 × exp (11) | 6.3 |
| 17 | 17 | ζ | 0.5 | I | 7.2 × exp (11) | 6.0 |
| 18 | 18 | η | 0.2 | I | 1.0 × exp (12) | 5.0 |
| 19 | 19 | θ | 0.5 | II | 5.5 × exp (11) | 6.4 |
| 20 | 20 | ι | 1.0 | I | 4.9 × exp (11) | 6.6 |
| 21 | 21 | ι | 0.2 | I | 2.7 × exp (12) | 4.0 |
| 22 | 22 | η | 0.5 | III | 3.0 × exp (12) | 3.7 |
| 23 | 23 | θ | 0.5 | I | 7.5 × exp (11) | 5.8 |
| 24 | 24 | κ | 0.5 | III | 1.9 × exp (12) | 4.5 |
| 25 | 25 | ι | 1.0 | I | 5.3 × exp (11) | 6.5 |
| 26 | 26 | ζ | 1.0 | IV | 8.6 × exp (11) | 5.5 |
| 27 | 27 | κ | 0.2 | IV | 1.2 × exp (11) | 8.0 |
| 28 | 28 | ζ | 0.5 | II | 3.1 × exp (12) | 3.7 |
| 29 | 29 | η | 0.5 | I | 2.7 × exp (12) | 4.0 |
| 30 | 30 | κ | 2.0 | I | 2.2 × exp (11) | 7.5 |

TABLE 5

Seed diamond powder of the invention: Example (2): Si

| Kind | Kind of substrate | Seed diamond powder of the invention | | | Synthetic diamond nucleation density (n/cm²) | Synthesizing time of film thickness of 2 μm (hrs) |
|---|---|---|---|---|---|---|
| | | Symbol | Ratio of dispersion (g/l) | Adhering condition | | |
| Seed diamond powder of the invention | | | | | | |
| 31 | 31 | A | 0.2 | I | 2.5 × exp (12) | 4.6 |
| 32 | 31 | B | 0.5 | I | 7.1 × exp (11) | 5.0 |
| 33 | 31 | C | 0.2 | I | 3.5 × exp (12) | 3.6 |
| 34 | 31 | D | 1.0 | I | 2.5 × exp (12) | 4.8 |
| 35 | 31 | E | 0.2 | I | 2.0 × exp (12) | 5.0 |
| 36 | 31 | F | 2.0 | I | 7.2 × exp (11) | 5.0 |
| 37 | 31 | G | 0.5 | I | 2.8 × exp (12) | 4.4 |
| 38 | 31 | H | 1.0 | I | 3.5 × exp (12) | 3.6 |
| 39 | 31 | I | 0.2 | I | 3.0 × exp (11) | 5.5 |
| 40 | 31 | J | 0.5 | I | 2.6 × exp (12) | 4.5 |
| 41 | 31 | K | 0.5 | I | 3.0 × exp (12) | 3.8 |
| 42 | 31 | L | 0.2 | I | 2.9 × exp (12) | 4.2 |
| 43 | 31 | M | 0.5 | I | 3.0 × exp (12) | 4.0 |
| 44 | 31 | N | 0.5 | 1 | 6.7 × exp (11) | 5.0 |

TABLE 5-continued

Seed diamond powder of the invention: Example (2): Si

| Kind | Kind of substrate | Seed diamond powder of the invention Symbol | Ratio of dispersion (g/l) | Adhering condition | Synthetic diamond nucleation density (n/cm$^2$) | Synthesizing time of film thickness of 2 μm (hrs) |
|---|---|---|---|---|---|---|
| 45 | 31 | O | 0.5 | I | 2.5 × exp (12) | 4.5 |
| 46 | 31 | P | 0.5 | I | 1.2 × exp (12) | 4.8 |
| 47 | 31 | Q | 0.2 | I | 2.8 × exp (12) | 4.2 |
| 48 | 31 | R | 0.5 | I | 3.2 × exp (12) | 3.6 |
| 49 | 31 | S | 0.5 | I | 6.0 × exp (11) | 5.0 |
| 50 | 31 | T | 0.5 | I | 2.1 × exp (11) | 5.2 |
| 51 | 31 | U | 0.5 | I | 3.1 × exp (12) | 3.8 |
| 52 | 31 | V | 1.0 | I | 3.3 × exp (12) | 3.8 |
| 53 | 31 | W | 0.5 | I | 3.2 × exp (12) | 3.8 |
| 54 | 31 | A | 0.5 | II | 2.7 × exp (12) | 4.5 |
| 55 | 31 | J | 1.0 | II | 3.1 × exp (12) | 3.8 |
| 56 | 31 | B | 0.2 | III | 2.2 × exp (12) | 4.3 |
| 57 | 31 | O | 0.5 | III | 2.6 × exp (12) | 4.7 |
| 58 | 31 | C | 0.2 | IV | 3.4 × exp (12) | 3.8 |
| 59 | 31 | T | 1.0 | IV | 2.0 × exp (12) | 5.0 |

TABLE 6

Conventional seed diamond powder: Comparative Example (1)

| Kind | Kind of substrate | Conventional diamond powder Symbol | Ratio of dispersion (g/l) | Adhering condition | Synthetic diamond nucleation density (n/cm$^2$) | Synthesizing time of film thickness of 2 μm (hrs) |
|---|---|---|---|---|---|---|
| Conventional seed diamond powder | | | | | | |
| 1 | 1 | a | 0.2 | I | 2.7 × exp (10) | 9.6 |
| 2 | 2 | f | 0.5 | I | 5.0 × exp (09) | 10.8 |
| 3 | 3 | d | 0.2 | I | 7.8 × exp (09) | 10.5 |
| 4 | 4 | g | 1.0 | I | 3.0 × exp (08) | 13.0 |
| 5 | 5 | h | 0.2 | I | 2.3 × exp (08) | 14.0 |
| 6 | 6 | i | 0.5 | I | 6.5 × exp (08) | 12.0 |
| 7 | 7 | e | 1.0 | II | 2.6 × exp (08) | 13.2 |
| 8 | 8 | b | 0.5 | I | 1.5 × exp (10) | 10.0 |
| 9 | 9 | c | 1.0 | II | 8.1 × exp (09) | 10.3 |
| 10 | 10 | a | 0.5 | IV | 2.7 × exp (08) | 13.4 |
| 11 | 11 | j | 0.5 | I | 5.8 × exp (07) | 15.0 |
| 12 | 12 | c | 0.5 | I | 9.6 × exp (06) | 17.2 |
| 13 | 13 | d | 1.0 | I | 1.2 × exp (07) | 17.0 |
| 14 | 14 | e | 0.2 | I | 8.3 × exp (06) | 17.6 |
| 15 | 15 | a | 1.0 | II | 2.5 × exp (07) | 16.3 |
| 16 | 16 | b | 0.2 | IV | 7.0 × exp (07) | 14.2 |
| 17 | 17 | c | 0.5 | I | 6.2 × exp (07) | 14.6 |
| 18 | 18 | d | 0.2 | I | 2.2 × exp (08) | 14.0 |
| 19 | 19 | e | 0.5 | II | 5.3 × exp (07) | 15.5 |
| 20 | 20 | g | 1.0 | I | 7.8 × exp (06) | 18.0 |
| 21 | 21 | f | 0.2 | I | 9.2 × exp (08) | 11.2 |
| 22 | 22 | i | 0.5 | III | 7.4 × exp (06) | 18.2 |
| 23 | 23 | j | 0.5 | I | 6.3 × exp (06) | 18.5 |
| 24 | 24 | g | 0.5 | III | 5.4 × exp (08) | 12.3 |
| 25 | 25 | a | 1.0 | I | 2.5 × exp (06) | 19.5 |
| 26 | 26 | h | 1.0 | IV | 5.6 × exp (07) | 15.4 |
| 27 | 27 | a | 0.2 | I | 3.0 × exp (06) | 19.0 |
| 28 | 28 | b | 0.5 | II | 2.3 × exp (07) | 16.5 |
| 29 | 29 | c | 0.5 | I | 8.9 × exp (06) | 17.6 |
| 30 | 30 | b | 2.0 | I | 1.2 × exp (06) | 20.5 |

TABLE 7

Conventional seed diamond powder: Comparative Example (2): Si

| Kind | Kind of substrate | Symbol | Ratio of dispersion (g/l) | Adhering condition | Synthetic diamond nucleation density (n/cm$^2$) | Synthesizing time of film thickness of 2 $\mu$m (hrs) |
|---|---|---|---|---|---|---|
| Conventional seed diamond powder | | | | | | |
| 31 | 31 | a | 0.2 | I | 9.2 × exp (09) | 10.0 |
| 32 | 31 | b | 0.5 | I | 1.4 × exp (09) | 11.0 |
| 33 | 31 | c | 0.2 | I | 2.8 × exp (10) | 9.6 |
| 34 | 31 | d | 1.0 | I | 7.5 × exp (09) | 10.6 |
| 35 | 31 | e | 0.5 | I | 6.8 × exp (09) | 11.0 |
| 36 | 31 | f | 2.0 | I | 1.5 × exp (09) | 10.5 |
| 37 | 31 | g | 0.5 | I | 6.4 × exp (09) | 9.8 |
| 38 | 31 | h | 1.0 | I | 1.0 × exp (10) | 9.6 |
| 39 | 31 | i | 0.2 | I | 2.1 × exp (08) | 12.5 |
| 40 | 31 | j | 0.5 | I | 6.6 × exp (09) | 10.2 |
| 41 | 31 | a | 0.5 | II | 7.4 × exp (09) | 10.4 |
| 42 | 31 | e | 1.0 | II | 6.9 × exp (09) | 10.5 |
| 43 | 31 | c | 0.2 | III | 1.0 × exp (10) | 9.6 |
| 44 | 31 | f | 0.5 | III | 7.8 × exp (08) | 11.0 |
| 45 | 31 | b | 0.2 | IV | 6.5 × exp (08) | 11.6 |
| 46 | 31 | h | 1.0 | IV | 8.1 × exp (09) | 10.2 |

TABLE 8

Examples and Comparative Examples of dispersed solution concentration

| Kind | Kind of substrate | Symbol | Ratio of dispersion (g/l) | Adhering condition | Synthetic diamond nucleation density (n/cm$^2$) |
|---|---|---|---|---|---|
| Example | | | | | |
| 60 | 31 | A | 0.010 | II | 2.1 × exp (12) |
| 61 | 31 | A | 0.030 | II | 2.4 × exp (12) |
| 62 | 31 | A | 0.050 | II | 2.6 × exp (12) |
| 63 | 31 | A | 0.100 | II | 2.6 × exp (12) |
| 64 | 31 | A | 3.000 | II | 2.5 × exp (12) |
| Comparative Example | | | | | |
| 47 | 31 | A | 0.001 | II | 7.8 × exp (10) |
| 48 | 31 | A | 0.002 | II | 1.2 × exp (11) |
| 49 | 31 | A | 0.004 | II | 2.5 × exp (11) |
| 50 | 31 | A | 0.006 | II | 6.5 × exp (11) |
| 51 | 31 | A | 0.008 | II | 7.6 × exp (11) |

Obviously, numerous modifications and variations of the present invention are possible in light of the above teachings. It is therefore to be understood that within the scope of the appended claims, the invention may be practiced otherwise than as specifically described herein.

The priority documents of the present application, Japanese Patent Applications 09-277375 and 10-083675, filed on Oct. 9, 1997 and Mar. 30, 1998, respectively, are hereby incorporated by reference.

What is claimed is:

1. A diamond powder, comprising:
   diamond powder particles, and
   polar and non-polar groups, bonded onto surfaces of said particles.

2. The diamond powder of claim 1, wherein said polar groups comprise at least one member selected from the group consisting of hydroxyl groups, carbonyl groups, aldehyde groups, and carboxyl groups,
   said non-polar group groups comprise at least one member selected from the group consisting of alkyl groups, phenyl groups, vinyl groups, acetyl groups, alkoxyl groups, and methacryl groups.

3. A diamond powder dispersed solution, comprising:
   the diamond powder of claim 1, and
   a dispersant.

4. A diamond powder dispersed solution, comprising:
   the diamond powder of claim 2, and
   a dispersant.

5. The diamond powder dispersed solution of claim 4, wherein said dispersant is at least one member selected from the group consisting of alcohols, aldehydes, ketones and esters.

6. The diamond powder dispersed solution of claim 4, wherein said dispersant is at least one member selected from the group consisting of methanol, ethanol, 2-propanol, acetone and diethylether.

7. The diamond powder dispersed solution of claim 4, wherein said dispersed solution has a concentration of 0.01 to 3.0 g/l.

8. The diamond powder dispersed solution of claim 4, wherein said dispersed solution has a concentration of 0.03 to 2.0 g/l.

9. A seeded substrate, comprising:
   a substrate,
   the diamond powder of claim 1, on a surface of said substrate.

10. A seeded substrate, comprising:
    a substrate,
    the diamond powder of claim 2, on a surface of said substrate.

11. A method of preparing the diamond powder of claim 1, comprising:

bonding polar groups to surfaces of a first diamond powder, to form a second diamond powder; and bonding non-polar groups to surfaces of said second diamond powder, to form a third diamond powder.

12. A method of preparing the diamond powder of claim 2, comprising:

bonding polar groups to surfaces of a first diamond powder, to form a second diamond powder; and bonding non-polar groups to surfaces of said second diamond powder, to form a third diamond powder.

13. A method of forming the diamond powder dispersed solution of claim 3, comprising dispersing said diamond powder in said dispersant.

14. A method of forming the diamond powder dispersed solution of claim 4, comprising dispersing said diamond powder in said dispersant.

15. A method of forming the diamond powder dispersed solution of claim 6, comprising dispersing said diamond powder in said dispersant.

16. A method of forming the diamond powder dispersed solution of claim 8, comprising dispersing said diamond powder in said dispersant.

17. A method of forming the seeded substrate of claim 9, comprising contacting said surface of said substrate with a diamond powder dispersed solution, wherein said diamond powder dispersed solution comprises said diamond powder.

18. A method of forming the seeded substrate of claim 10, comprising contacting said surface of said substrate with a diamond powder dispersed solution, wherein said diamond powder dispersed solution comprises said diamond powder.

19. A method of making a diamond film, comprising forming a diamond film on the seeded substrate of claim 9 by chemical vapor deposition.

20. A method of making a diamond film, comprising forming a diamond film on the seeded substrate of claim 10 by chemical vapor deposition.

21. A diamond film prepared by the method of claim 19.

22. A diamond film prepared by the method of claim 20.

23. The diamond powder of claim 2, wherein said polar groups comprise at least hydroxyl groups.

24. The diamond powder of claim 2, wherein said polar groups comprise at least carbonyl groups.

25. The diamond powder of claim 2, wherein said polar groups comprise at least aldehyde groups.

26. The diamond powder of claim 2, wherein said polar groups comprise at least carboxyl groups.

27. The diamond powder of claim 2, wherein said non-polar group groups comprise at least alkyl groups.

28. The diamond powder of claim 2, wherein said non-polar group groups comprise at least phenyl groups.

29. The diamond powder of claim 2, wherein said non-polar group groups comprise at least vinyl groups.

30. The diamond powder of claim 2, wherein said non-polar group groups comprise at least acetyl groups.

31. The diamond powder of claim 2, wherein said non-polar group groups comprise at least alkoxyl groups.

32. The diamond powder of claim 2, wherein said non-polar group groups comprise at least methacryl groups.

* * * * *